US011532139B1

(12) United States Patent
Kovacs et al.

(10) Patent No.: US 11,532,139 B1
(45) Date of Patent: Dec. 20, 2022

(54) METHOD AND DEVICE FOR IMPROVED PATHFINDING

(71) Applicant: Apple Inc., Cupertino, CA (US)

(72) Inventors: Daniel Laszlo Kovacs, Santa Clara, CA (US); Payal Jotwani, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/323,775

(22) Filed: May 18, 2021

Related U.S. Application Data

(60) Provisional application No. 63/035,784, filed on Jun. 7, 2020.

(51) Int. Cl.
*G06T 19/00* (2011.01)
*G06T 17/20* (2006.01)
*G06T 15/08* (2011.01)

(52) U.S. Cl.
CPC ............ *G06T 19/006* (2013.01); *G06T 15/08* (2013.01); *G06T 17/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,311,742 | B1 * | 4/2016 | Glover | G06T 13/00 |
| 10,792,568 | B1 * | 10/2020 | Merrill | A63F 13/56 |
| 2005/0144574 | A1 * | 6/2005 | Chang | G06T 19/003 |
| | | | | 715/850 |
| 2011/0191365 | A1 * | 8/2011 | Betzler | G06F 16/00 |
| | | | | 707/769 |
| 2018/0106628 | A1 * | 4/2018 | Mayran De Chamisso | |
| | | | | G05D 1/0274 |
| 2020/0070053 | A1 * | 3/2020 | Scheurwater | G06F 3/04815 |

(Continued)

FOREIGN PATENT DOCUMENTS

WO    WO-2005091198 A1 *    9/2005    ............. A63F 13/10

OTHER PUBLICATIONS

Julien Ceipek, "Game Path Planning," The Oliner's Guide to Programming Concepts, Retrieved from the Internet Jan. 11, 2020: http://jceipek.com/Olin-Coding-Tutorials/pathing.html, pp. 1-14.

(Continued)

*Primary Examiner* — Andrew G Yang
(74) *Attorney, Agent, or Firm* — Fernando & Partners, LLP

(57) ABSTRACT

In some implementations, a method of improved pathfinding is performed at a virtual agent operating system including non-transitory memory and one or more processors coupled with the non-transitory memory. The method includes: determining an initial path for a virtual agent to a target destination based at least in part on a navigation mesh of an XR environment; actuating locomotive elements of the virtual agent in order to move the virtual agent according to the initial path; while moving according to the initial path, detecting a node of a navigation graph; in response to detecting the node of the navigation graph: obtaining navigation information from the node of the navigation graph; and determining an updated path from the node to the target destination based at least in part on the navigation mesh and the navigation information; and actuating the locomotive elements of the virtual agent according to the updated path.

22 Claims, 14 Drawing Sheets

(56) References Cited

U.S. PATENT DOCUMENTS

2020/0338450 A1* 10/2020 Parr .................. A63F 13/35

OTHER PUBLICATIONS

Xiao Cui et al., "An Overview of Pathfinding in Navigation Mesh," IJCSNS International Journal of Computer Science and Network Security, vol. 12, No. 12, Dec. 2012, pp. 48-51.
Leonel Deusdado et al., "Path Planning for Complex 3D Multilevel Environments," Proceedings of the 24th Spring Conference on Computer Graphics, 2008, pp. 187-194.
Marcelo Kallmann et al., "Navigation Meshes and Real-Time Dynamic Planning for Virtual Worlds," ACM SIGGRAPH 2014 Courses, 2014, pp. 1-18.
Wouter Van Toll et al., "A Comparative Study of Navigation Meshes," Proceedings of the 9th International Conference on Motion in Games, 2016, pp. 91-100.
Wouter Van Toll et al., "Navigation Meshes for Realistic Multi-Layered Environments," 2011 IEEE/RSJ International Conference on Intelligent Robots and Systems, 2011, pp. 3526-3532.

* cited by examiner

Mono-Planar, Single Layer 3D Environment 610

Multi-Planar, Single Layer 3D Environment 620

Mono-Planar, Multi-Layer 3D Environment 630

Navigation Mesh 634

Walkable Environment 632

Mono-Planar, Multi-Layer 3D Environment 630

METHOD AND DEVICE FOR IMPROVED PATHFINDING

TECHNICAL FIELD

The present disclosure generally relates to virtual agents, and in particular, to systems, methods, and devices for improved pathfinding for virtual agents.

BACKGROUND

With increased memory and computing resources, navigation meshes have come to replace waypoint networks for virtual agents or non-player characters (NPCs) within video games and the like. As compared to waypoint networks, navigation meshes enable improved pathfinding flexibility. As one example, an A* or Dijkstra search algorithm may be used to find a path from an origin point to a destination point within the navigation mesh. Furthermore, once the path is computed, smoothing and/or steering algorithms may additionally be applied to make the path more realistic, e.g., a less zigzag-like path. The problem with this approach is the latency involved in computing the realistic path and failures of the search algorithms when handling a navigation mesh more complicated than a two-dimensional (2D) planar surface.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
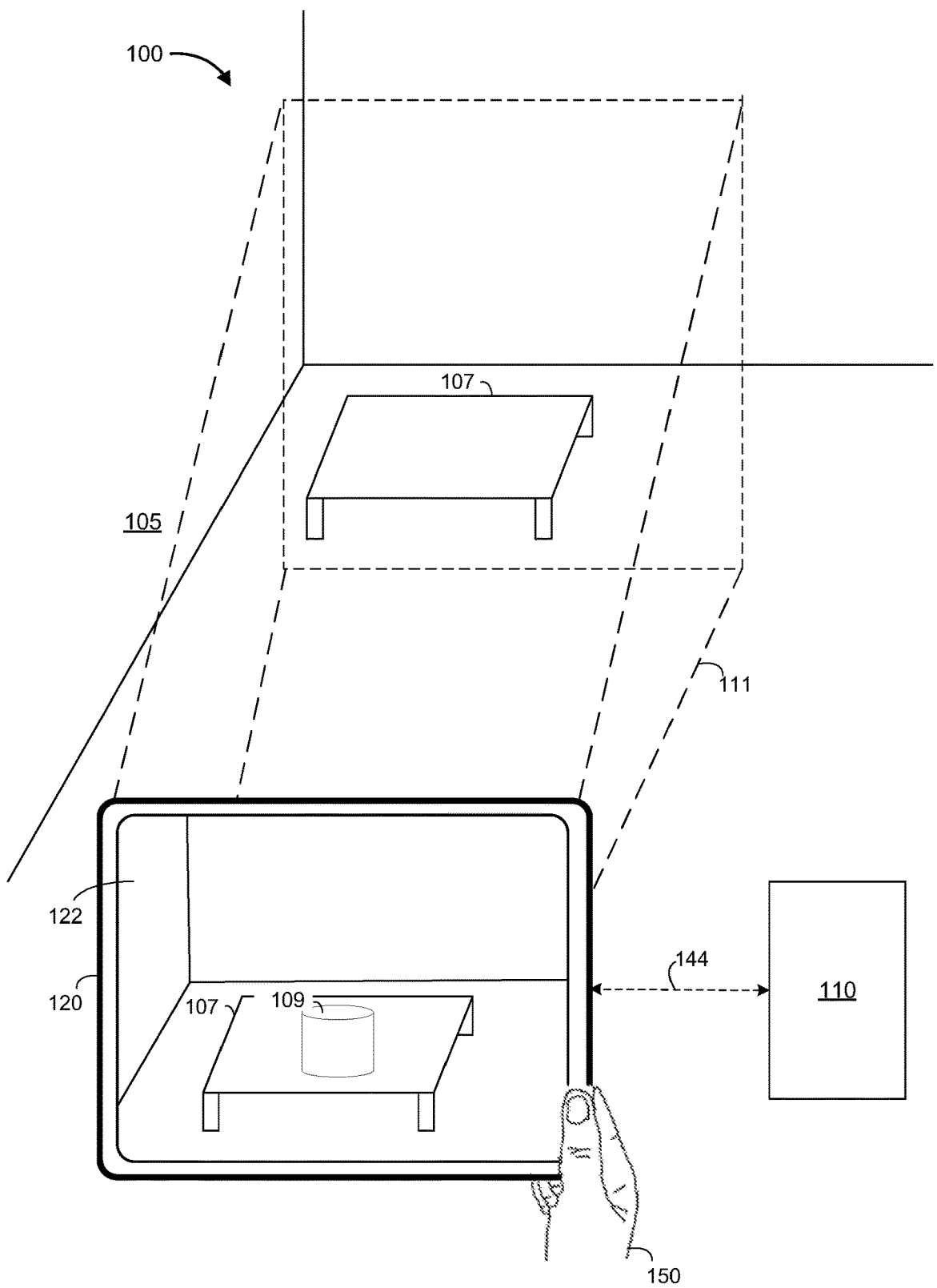
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for improved pathfinding. According to some implementations, the method is performed at a virtual agent operating system including non-transitory memory and one or more processors coupled with the non-transitory memory. The method includes: determining an initial path for a virtual agent from an origin to a target destination within an extended reality (XR) environment based at least in part on a navigation mesh of the XR environment, wherein the navigation mesh is a surface that characterizes the navigable area of the XR environment as a function of a locomotive profile for the virtual agent; obtaining a navigation graph associated with the XR environment including a plurality of nodes corresponding to points on the navigation mesh, wherein each node includes information for computing a path to another location within the navigation mesh; actuating one or more locomotive elements of the virtual agent in order to move the virtual agent according to the initial path within the XR environment; while moving according to the initial path, detecting a node of the navigation graph; in response to detecting the node of the navigation graph: obtaining navigation information from the node of the navigation graph; and determining an updated path from the node to the target destination based at least in part on the navigation mesh and the navigation information; and actuating the one or more locomotive elements of the virtual agent in order to move the virtual agent according to the updated path within the XR environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107 or a representation thereof) on a display 122. For example, the XR environment 128, including the XR cylinder 109, is volumetric or three-dimensional (3D).

In one example, the XR cylinder 109 corresponds to head/display-locked content such that the XR cylinder 109 remains displayed at the same location on the display 122 as the FOV 111 changes due to translational and/or rotational movement of the electronic device 120. As another example, the XR cylinder 109 corresponds to world/object-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
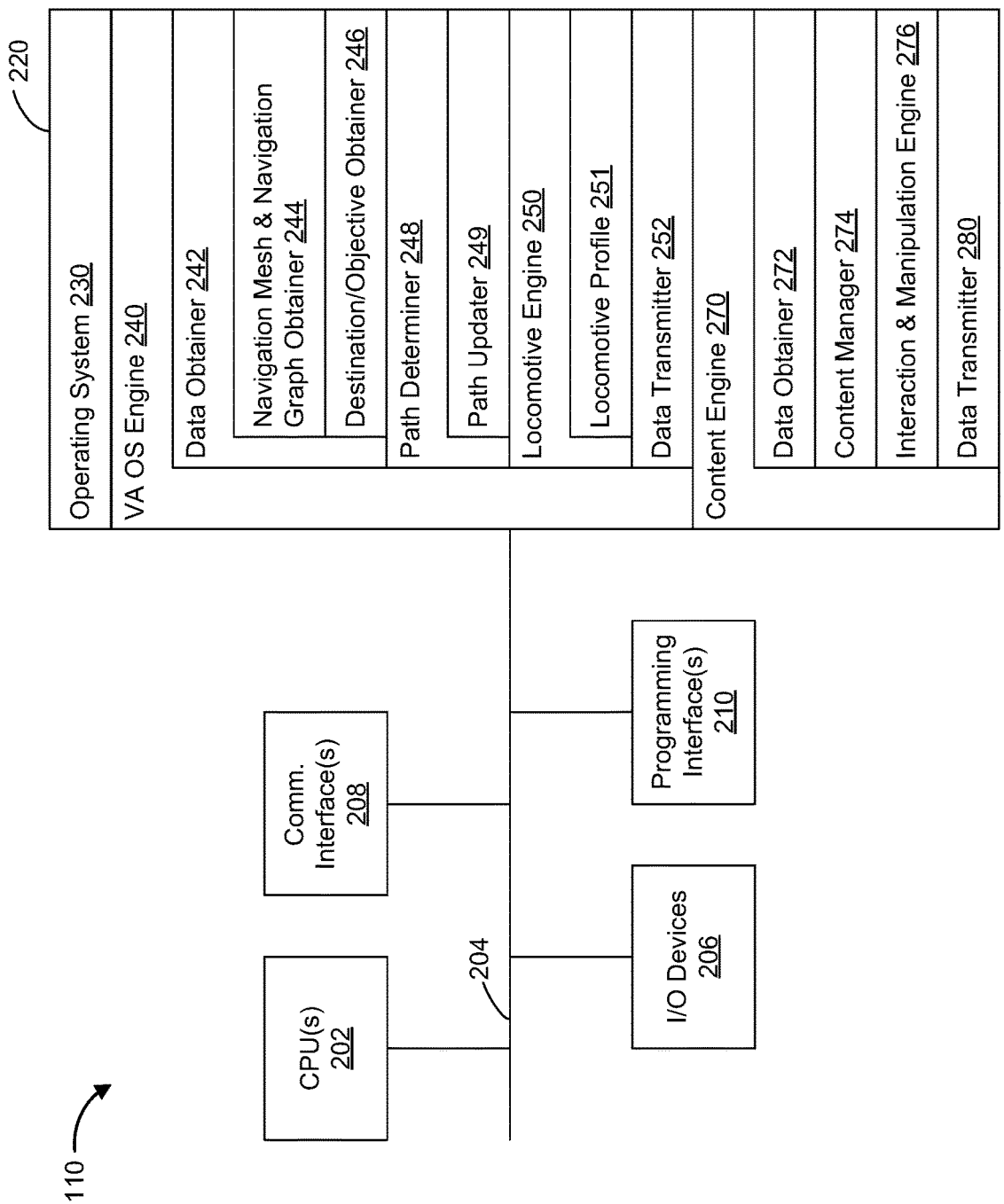
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a virtual agent (VA) operating system (OS) engine 240, and a content engine 270.

The operating system 230 includes procedures for handling various basic system services and for performing hardware dependent tasks.

In some implementations, the VA OS engine 240 is configured to manage, handle, and drive one or more VAs within an XR environment. For example, the one or more VAs may correspond to bipedal humanoids or the like that are restricted by gravity and maintain contact with a planar surface of the XR environment such as the floor. In another example, the one or more VAs may correspond to other entities, such as a spider, that are unrestricted (or partially restricted) by gravity and maintain contact with a planar surface of the XR environment such as the floor, walls, or ceiling. In another example, the one or more VAs may correspond to various other entities, such as a flying insect, that are able to navigate the XR environment as a volumetric 3D space. To that end, in some implementations, the VA OS engine 240 includes a data obtainer 242, a path determiner 248, a locomotive engine 250, and a data transmitter 252.

In some implementations, the data obtainer 242 is configured to obtain data (e.g., navigation information, input data, location data, etc.) from at least one of the I/O devices 206 of the controller 110, the electronic device 120, and the optional remote input devices. To that end, in various implementations, the data obtainer 242 includes instructions and/or logic therefor, and heuristics and metadata therefor. In some implementations, the data obtainer 242 includes a navigation mesh and navigation graph obtainer 244 and a destination/objective obtainer 246.

In some implementations, the navigation mesh and navigation graph obtainer 244 obtains (e.g., receives, retrieves, or generates) a navigation mesh and a navigation graph for the XR environment. In some implementations, the navigation mesh is a surface that characterizes the navigable area of the XR environment as a function of a locomotive profile for the VA. For example, the navigation mesh and navigation graph obtainer 244 receives the navigation mesh and the navigation graph from a local memory, a remote memory, or another source. In another example, the navigation mesh and navigation graph obtainer 244 retrieves the navigation mesh and the navigation graph from a local memory, a remote memory, or another source. In yet another example, the navigation mesh and navigation graph obtainer 244 generates the navigation mesh according to one or more techniques described below with reference to FIG. 6B. In yet another example, the navigation mesh and navigation graph obtainer 244 generates the navigation graph. To that end, in various implementations, the navigation mesh and navigation graph obtainer 244 includes instructions and/or logic therefor, and heuristics and metadata therefor.

In some implementations, the destination/objective obtainer 246 obtains (e.g., receives, retrieves, or generates) an objective or destination within the XR environment for the VA. For example, the destination/objective obtainer 246 receives the destination/objective from a user input, a local memory, a remote memory, or another source. In another example, the destination/objective obtainer 246 retrieves the destination/objective from a local memory, a remote memory, or another source. In yet another example, the destination/objective obtainer 246 generates the destination/objective based on the XR environment, one or more user inputs, one or more user preferences, and/or the like. As yet another example, the destination/objective obtainer 246 intelligently or pseudo-randomly selects the destination/objective from a predefined set of available destination/objectives for the XR environment or the like. To that end, in various implementations, the destination/objective obtainer 246 includes instructions and/or logic therefor, and heuristics and metadata therefor.

In some implementations, the path determiner 248 is configured to determines an initial path for the VA from an origin to a target destination within the XR environment based at least in part on a navigation mesh of the XR environment. To that end, in various implementations, the path determiner 248 includes instructions and/or logic therefor, and heuristics and metadata therefor.

In some implementations, the path determiner 248 also includes a path updater 249 that is configured to determine an updated path from a node of a navigation graph to the destination based at least in part on the navigation mesh and the navigation information obtained from the node of the navigation graph. To that end, in various implementations, the path updater 249 includes instructions and/or logic therefor, and heuristics and metadata therefor.

In some implementations, the locomotive engine 250 is configured to actuate one or more locomotive elements (e.g., joints, limbs, etc.) of the VA based on a locomotive profile 251 for the VA in order to move the virtual agent according to the initial path and/or the updated path within the XR environment. The locomotive profile 251 is described in more detail below with reference to FIG. 5. To that end, in various implementations, the locomotive engine 250 includes instructions and/or logic therefor, and heuristics and metadata therefor.

In some implementations, the data transmitter 252 is configured to transmit data (e.g., VA location information, VA movement information, etc.) to at least the electronic device 120 or the content engine 270. To that end, in various implementations, the data transmitter 252 includes instructions and/or logic therefor, and heuristics and metadata therefor.

Although the data obtainer 242, the path determiner 248, the locomotive engine 250, and the data transmitter 252 are shown as residing on a single device (e.g., the controller 110), it should be understood that in other implementations, any combination of the data obtainer 242, the path determiner 248, the locomotive engine 250, and the data transmitter 252 may be located in separate computing devices.

In some implementations, the content engine 270 is configured to manage, handle, and update the XR environment and the objects therein. To that end, in some implementations, the content engine 270 includes a data obtainer 272, a content manager 274, an interaction and manipulation engine 276, and a data transmitter 280.

In some implementations, the data obtainer 272 is configured to obtain data (e.g., presentation data, input data, user interaction data, head tracking information, camera pose tracking information, eye tracking information, sensor data, location data, etc.) from at least one of the I/O devices 206 of the controller 110, the electronic device 120, and the optional remote input devices. To that end, in various implementations, the data obtainer 272 includes instructions and/or logic therefor, and heuristics and metadata therefor.

In some implementations, the content manager 274 is configured to generate (i.e., render), manage, and modify an XR environment presented to a user. To that end, in various implementations, the content manager 274 includes instructions and/or logic therefor, and heuristics and metadata therefor.

In some implementations, the interaction and manipulation engine 276 is configured to interpret user interactions and/or modification inputs directed to the XR environment and XR objects therein. To that end, in various implementations, the interaction and manipulation engine 276 includes instructions and/or logic therefor, and heuristics and metadata therefor.

In some implementations, the data transmitter 280 is configured to transmit data (e.g., presentation data such as rendered image frames associated with the XR environment, location data, etc.) to at least the electronic device 120. To that end, in various implementations, the data transmitter 280 includes instructions and/or logic therefor, and heuristics and metadata therefor.

Although the data obtainer 272, the content manager 274, the interaction and manipulation engine 276, and the data transmitter 280 are shown as residing on a single device (e.g., the controller 110), it should be understood that in other implementations, any combination of the data obtainer 272, the content manager 274, the interaction and manipulation engine 276, and the data transmitter 280 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
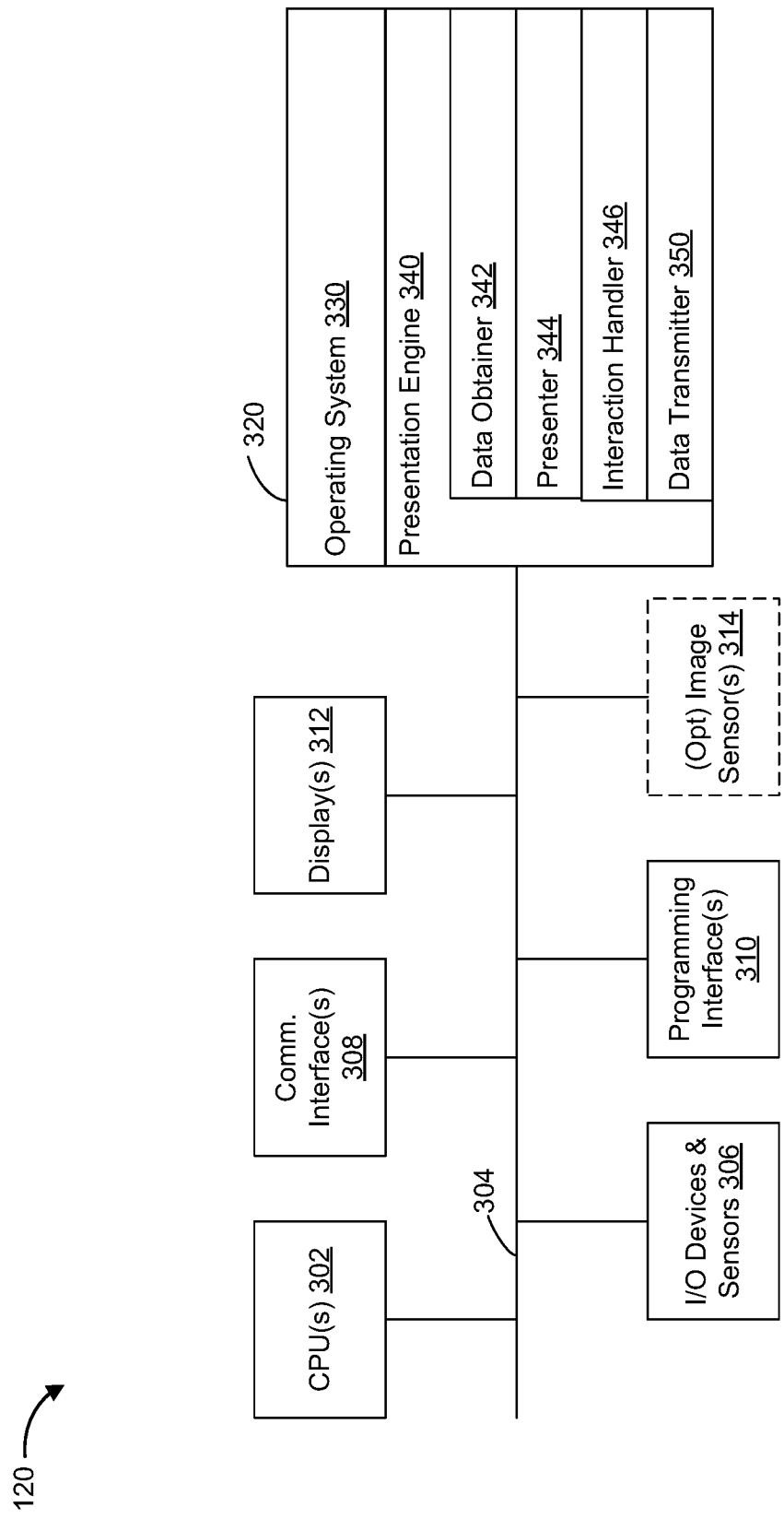
FIG. 3 is a block diagram of an example electronic device in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, the one or more optional image sensors 314 (e.g., one or more optional interior-facing and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), an eye tracking engine, a body/head pose tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation engine 340.

The operating system 330 includes procedures for handling various basic system services and for performing hardware dependent tasks. In some implementations, the XR presentation engine 340 is configured to present XR content to the user via the one or more displays 312. To that end, in various implementations, the XR presentation engine 340 includes a data obtainer 342, a presenter 344, an interaction handler 346, and a data transmitter 350.

In some implementations, the data obtainer 342 is configured to obtain data (e.g., presentation data such as rendered image frames associated with the XR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 344 is configured to present and update XR content (e.g., the rendered image frames associated with the XR environment) via the one or more displays 312. To that end, in various implementations, the presenter 344 includes instructions and/or logic therefor, and heuristics and metadata therefor.

In some implementations, the interaction handler 346 is configured to detect user interactions with the presented XR content. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, etc.) to at least the controller 110. To that end, in various implementations, the data transmitter 350 includes instructions and/or logic therefor, and heuristics and metadata therefor.

Although the data obtainer 342, the presenter 344, the interaction handler 346, and the data transmitter 350 are shown as residing on a single device (e.g., the electronic device 120), it should be understood that in other implementations, any combination of the data obtainer 342, the presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
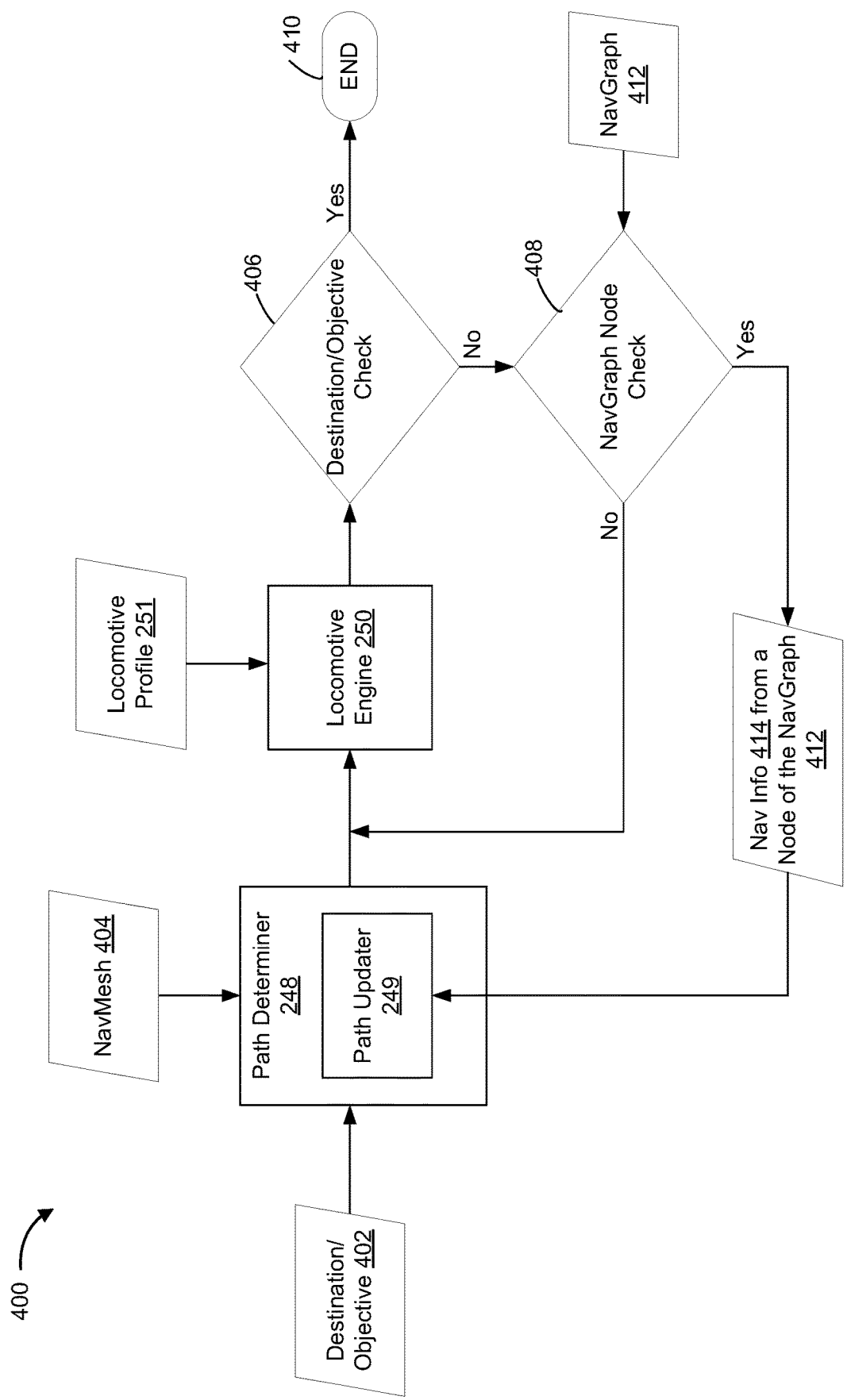
FIG. 4 is a block diagram of an example navigation architecture in accordance with some implementations.

FIG. 4 is a block diagram of an example navigation architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the navigation architecture 400 is included in or provided by the controller 110 shown in FIGS. 1 and 2 or a component thereof (e.g., the VA OS engine 240 in FIG. 2).

As shown in FIG. 4, the path determiner 248 determines an initial path for a virtual agent (VA) within an XR environment based at least in part on a navigation mesh 404 of the XR environment and a destination/objective 402. For example, the initial path is provided to locomote the VA from an origin to a target destination. In some implementations, the navigation mesh 404 is generated for the XR environment using one of more known techniques in the art such as local clearance triangulation, explicit corridor map, clearance disk graph, recast, NEOGEN, and/or the like. In some implementations, the destination/objective 402 is determined based on one or more user inputs (e.g., a voice command or the like), one or more user preferences (e.g., assigning the VA to perform a task such as pick up objects), and/or the like As shown in FIG. 4, the locomotive engine 250 actuates one or more locomotive elements (e.g., joints, limbs, etc.) of the VA in order to move the VA according to the initial path within the XR environment and the locomotive profile 251 associated with the VA. The locomotive profile 251 is described in more detail below with reference to FIG. 5.

As shown in FIG. 4, the navigation architecture 400 performs a destination/objective check 406 to determine whether the VA has reached its target destination or completed its objective. If the target destination has been reached or the objective has been completed, the VA stops locomoting and the process reaches its end 410.

However, if the target destination has neither been reached nor has the objective has been completed, the navigation architecture 400 performs a navigation graph node check 408 to determine whether the VA has detected (e.g., intersected, reached, walked/ran into, or otherwise encountered) a node of a navigation graph 412. If a node of the navigation graph has not been detected, the VA continues along the initial path. If a node of the navigation graph has been detected, the navigation architecture 400 obtains navigation information 414 from the node of the navigation graph 412. The navigation information 414 is provided to the path updater 249, and the path updater 249 determines an updated path from the node to the target destination based at least in part on the navigation mesh 404 and the navigation information 414. Thereafter, the locomotive engine 250 actuates the one or more locomotive elements (e.g., joints, limbs, etc.) of the VA in order to move the VA according to the updated path within the XR environment and the locomotive profile 251 associated with the VA. One of ordinary skill in the art will appreciate that the path may be updated more than one time as other nodes of the navigation graph are encountered. One of ordinary skill in the art will appreciate that the path may be updated more than one time if the destination/objective changes. One of ordinary skill in the art will appreciate that the navigation architecture 400 may handle more than one VA in parallel within the XR environment.

Figure 5:
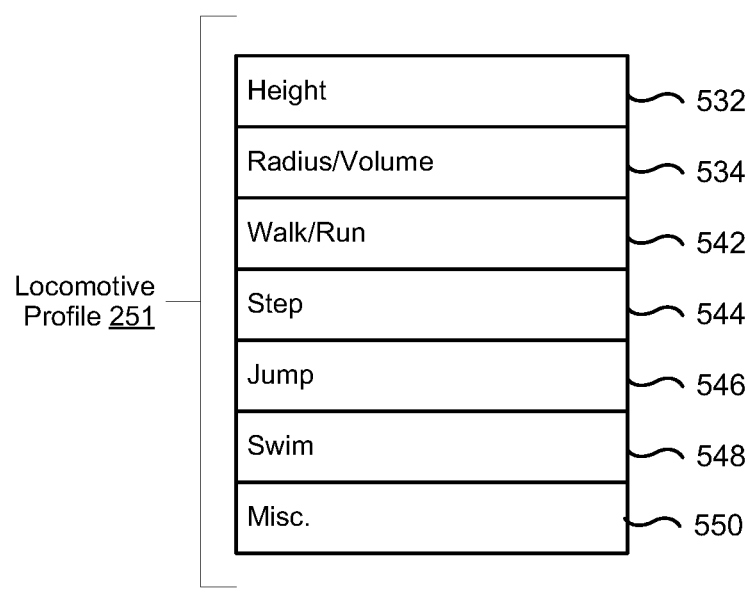
FIG. 5 is a block diagram of an example data structure for a locomotive profile in accordance with some implementations.

FIG. 5 is a block diagram of an example data structure for a locomotive profile 251 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the locomotive profile 251 includes size characteristics for a particular VA (e.g., height, width, depth, radius, etc.) and movement characteristics for the virtual agent. (e.g., gait size, jump height, jump length, walk and run speed, etc.).

As shown in FIG. 5, the locomotive profile 251 includes: a height characteristic 532 for the particular VA (e.g., a height value to determine overhead clearance), and a radius or volume characteristic 534 for the particular VA (e.g., a radius value to determine a berth region). In some implementations, a VA is represented by a cylinder or other volumetric shape. The locomotive profile 251 further includes: a walk/run characteristic 542 for the particular VA (e.g., velocity, acceleration, etc. values for various modes of locomotion), a step characteristic 544 for the particular VA (e.g., a displacement value for each pace/step), a jump characteristic 546 for the particular VA (e.g., a height value for each jump), a swim characteristic 548 (e.g., a displacement value for each swim stoker) for the particular VA, and a miscellaneous characteristic 550 for the particular VA. One of ordinary skill in the art will appreciate that the locomotive profile 251 is merely an example and may include various other characteristics. One of ordinary skill in the art will appreciate that locomotive profiles for different VAs may change based on their type (e.g., animal, humanoid, robot, etc.) or various attributes (e.g., average humanoid, athletic humanoid, superhuman humanoid, etc.).

Figure 6A:
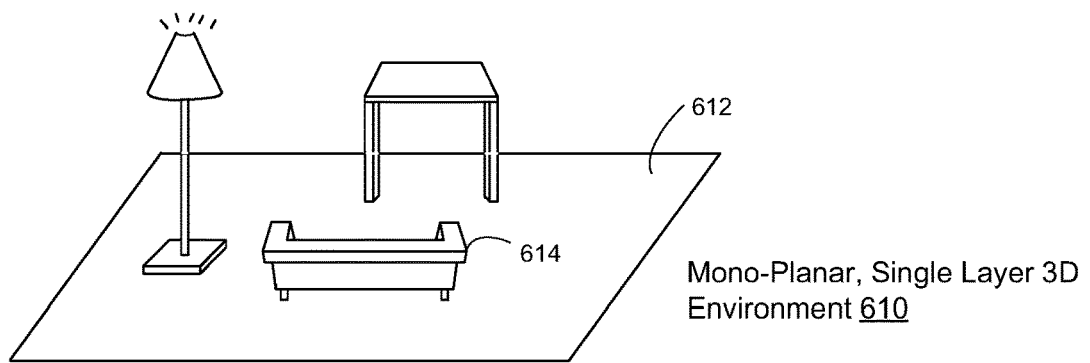
FIG. 6A illustrates example three-dimensional (3D) environments in accordance with some implementations.
Figure 6A:
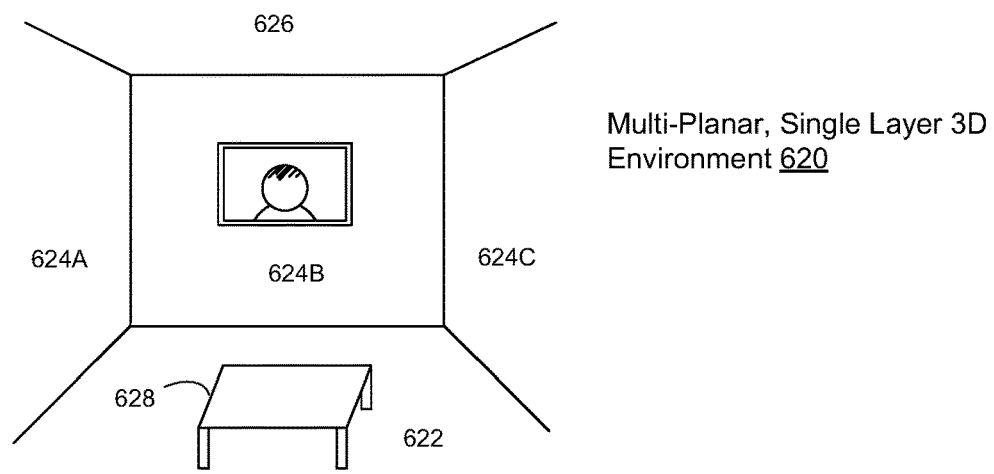
Figure 6A:
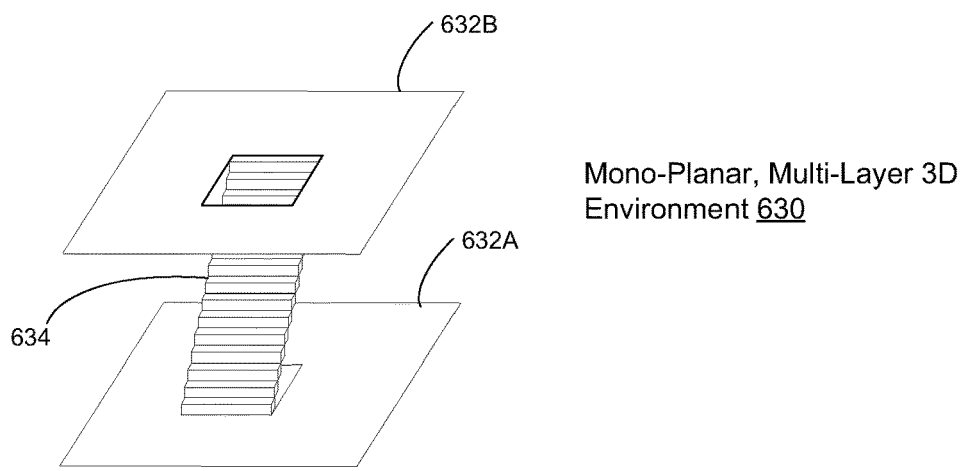

FIG. 6A illustrates example three-dimensional (3D) environments 610, 620, and 630 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the 3D environments 610, 620, and 630 correspond to physical environments with or without overlaid XR content (e.g., skinned walls). In some implementations, the 3D environments 610, 620, and 630 correspond to fully virtual environments. Thus, for example, the 3D environments 610, 620, and 630 correspond to video games levels with VAs (e.g., non-player characters (NPCs)) instantiated therein.

As shown in FIG. 6A, the 3D environment 610 corresponds to a mono-planar, single layer 3D environment where the walkable/locomotive area is limited to the floor 612. In this example, a VA (e.g., bipedal humanoid or the like) that is restricted by gravity is able to locomote/walk around the 3D environment 610 by maintaining contact with the floor 612 of the 3D environment 610 while avoiding any obstacles (e.g., the couch 614 and other furniture).

As shown in FIG. 6A, the 3D environment 620 corresponds to a multi-planar, single layer 3D environment where the walkable/locomotive area includes the floor 622, the ceiling 626, and the walls 624A, 624B, and 624C. In this example, a VA (e.g., spider or the like) that is unrestricted (or partially restricted) by gravity is able to locomote/walk around the 3D environment 620 by maintaining contact with the connected planar surfaces (e.g., the floor 622, the ceiling 626, and the walls 624A, 624B, and 624C) of the 3D environment 620 while avoiding any obstacles (e.g., the table 628 and other furniture).

As shown in FIG. 6A, the 3D environment 630 corresponds to a mono-planar, multi-layer 3D environment where the walkable/locomotive area includes the first floor 632A and the second floor 632B connected by a stairway 634. For example, In this example, a VA (e.g., bipedal humanoid or the like) that is restricted by gravity is able to walk around the 3D environment 610 by maintaining contact with the planar surfaces (e.g., the floors 632A and 632B on both levels connected by the stairway 634) of the 3D environment 610 while avoiding any obstacles.

One of ordinary skill in the art will appreciate that 3D environments may take various sizes, shapes, forms, or the like. One of ordinary skill in the art will appreciate that, in some implementation, a VA (e.g., a flying insect or the like) may navigate the 3D environments as a volumetric area. One of ordinary skill in the art will appreciate that various other permutations of the 3D environments are possible such as a multi-planar, multi-layer 3D environment.

Figure 6B:
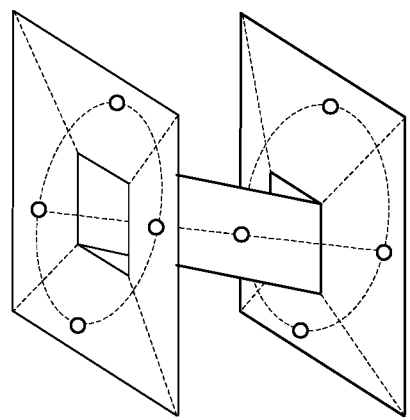
FIG. 6B illustrates an example navigation mesh for one of the 3D environments in FIG. 6A in accordance with some implementations.
Figure 6B:
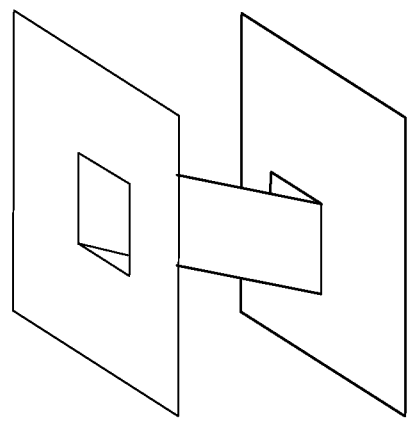
Figure 6B:
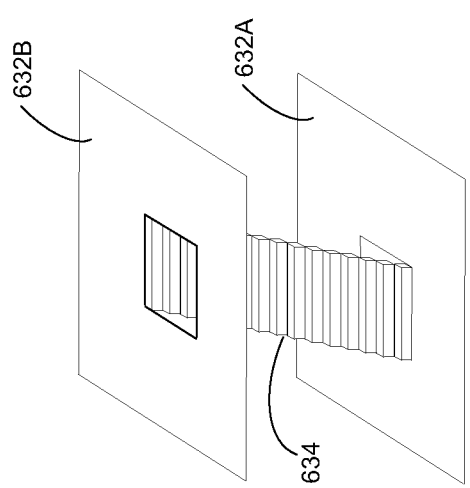

FIG. 6B illustrates an example navigation mesh 634 for the 3D environment 630 in FIG. 6A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

According to some implementations, a two-dimensional (2D) environment is a finite subset of a 2D plane with polygonal holes also referred to as obstacles. The obstacle space $\varepsilon_{obs}$ is the union of all obstacles. Its complement is the free space $\varepsilon_{free}$. Then, n is assigned to the number of vertices required to define $\varepsilon_{obs}$ or $\varepsilon_{free}$ using simple polygons. As such, n may also be referred to as the complexity of $\varepsilon$. 2D and 3D environments should be treated similarly.

Therefore, a 2D environment may be embedded in $\mathbb{R}^3$ by assigning a height component of zero to each vertex. A 3D environment is a raw collection of polygons in $\mathbb{R}^3$. These polygons may include floors, ceilings, walls, or any other type of geometry. For example, the 3D environment 630 in FIGS. 6A and 6B corresponds to a mon-planar, multi-layer 3D environment.

To define the free space $\varepsilon_{free}$ of a 3D environment, various parameters are delineated that describe the surfaces on which a virtual agent (VA) may walk. Examples of such parameters are the maximum slope with respect to the direction of gravity, the maximum height difference between nearby polygons (e.g., the maximum step height of a staircase), and the required vertical distance between a floor and a ceiling. VAs are typically approximated by cylinders. Some navigation meshes use a predefined VA radius to determine $\varepsilon_{free}$.

A walkable environment (WE) is a set of interior-disjoint polygons in $\mathbb{R}^3$ on which VAs can stand and walk. Thus, a WE is a clean representation of the free space $\varepsilon_{free}$ of a 3D environment, based on the filtering parameters and character properties mentioned earlier. Any two polygons are directly connected if and only if characters can walk directly between them. For example, the walkable environment 632 in FIG. 6B is a function of the 3D environment 630 and shows the regions on which a VA can directly walk. All polygons in the WE have a maximum slope with respect to the ground plane P, which is the plane perpendicular to the gravity direction $\vec{g}$. It is common for a navigation mesh to project the length of a path onto P as well, i.e., to ignore height differences along a path during planning.

The complexity of a WE is the total number of polygon vertices. The free space $\varepsilon_{free}$ is simply the set of polygons itself The obstacle space $\varepsilon_{obs}$ can be thought of as anything beyond the boundary of $\varepsilon_{free}$, but (unlike in 2D) it is difficult to represent or visualize because it does not necessarily consist of polygons on a plane.

After defining the free space $\varepsilon_{free}$, a navigation mesh can be defined as a tuple M=(R, G):

$R=\{R_o R_1, \ldots\}$ is a collection of geometric regions in $\mathbb{R}^3$ that represents $\varepsilon_{free}$. Each region $R_i$ is P-simple, which means that a region cannot intersect itself when projected onto the ground plane P.

G=(V, E) is an undirected graph that describes how characters can navigate between the regions in R.

For example, the navigation mesh 634 in FIG. 6B is a function of the 3D environment 630 and shows an abstract example of a navigation mesh. For many navigation meshes, R consists of non-overlapping simple polygons, and G is the dual graph of R, with one vertex per region and one edge per pair of adjacent region sides. However, other possibilities exist. As one example, using the Clearance Disk Graph technique, R consists of overlapping disks, and G contains an edge wherever two disks overlap. Still, in common across all meshes is that R and G can be obtained from their representation in some way.

One of ordinary skill in the art will appreciate that navigation meshes may be generated from various 3D environments. One of ordinary skill in the art will appreciate that navigation meshes may be generated according to various techniques known in the art such as local clearance triangulation, explicit corridor map, clearance disk graph, recast, NEOGEN, and/or the like.

FIGS. 7A-7F illustrate a sequence of instances 700, 710, 720, 730, 740, and 750 for a navigation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 7A:
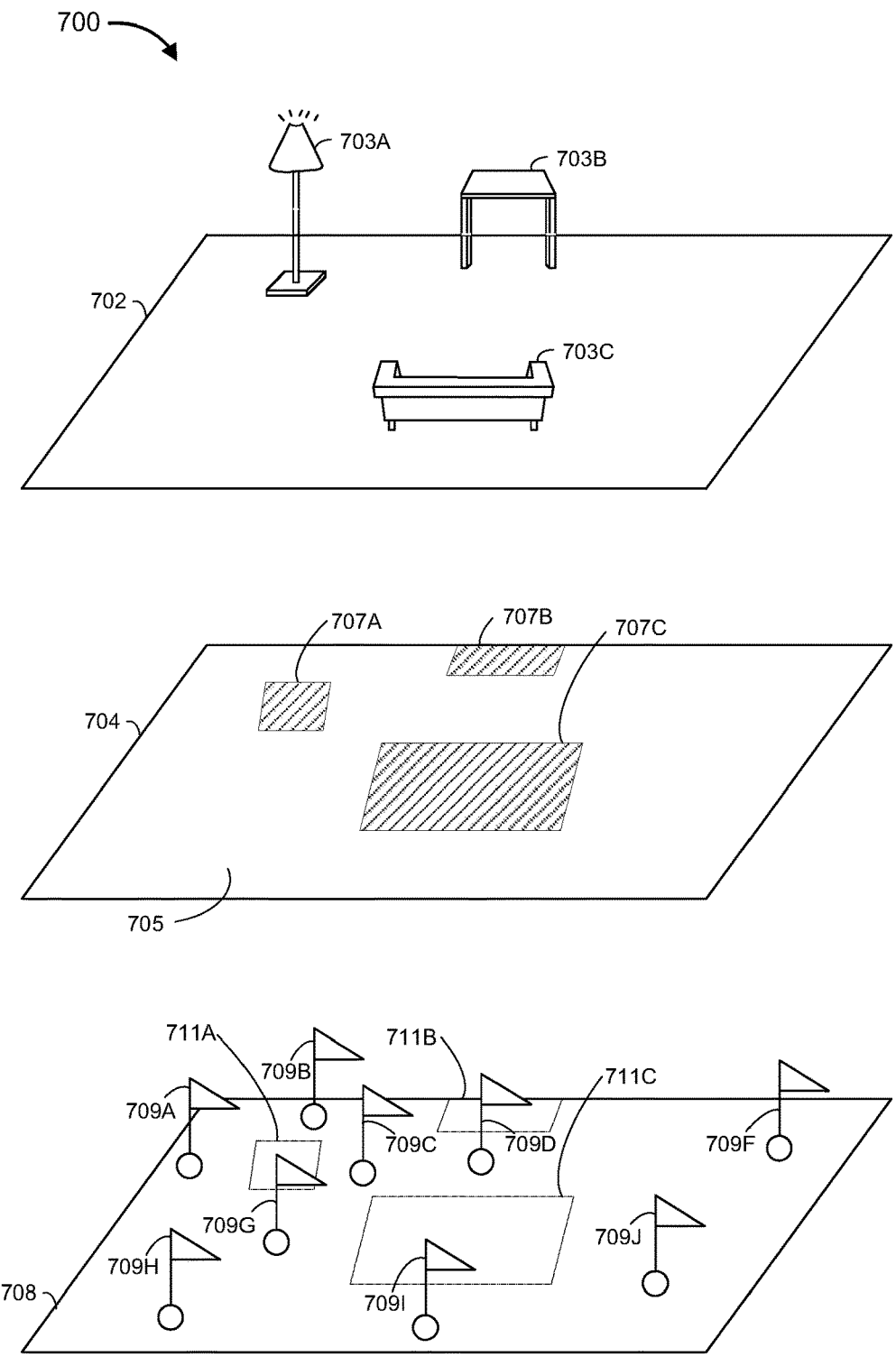
FIGS. 7A-7F illustrate a sequence of instances for a navigation scenario in accordance with some implementations.

As shown in FIG. 7A, the instance 700 (e.g., associated with time T0) of the navigation scenario shows a 3D environment 702, an abstract representation 704 of a navigation mesh for the 3D environment 702, and a navigation graph 708 associated with the 3D environment 702. According to some implementations, the 3D environment 702, the abstract representation 704 of the navigation mesh, and the navigation graph 708 share a similar coordinate system and similar dimensions.

As shown in FIG. 7A, the 3D environment 702 includes obstacles (e.g., objects) such as a lamp 703A, a table 703B, and a couch 703C. For example, the 3D environment 702 corresponds to a mono-planar, mono-layer 3D environment. One of ordinary skill in the art will appreciate that 3D environment may take a variety of shapes and sizes. One of ordinary skill in the art will appreciate that 3D environment may also include myriad obstacles or objects.

As shown in FIG. 7A, the abstract representation 704 of the navigation mesh is generated based on the 3D environment 702 and the obstacles therein. As such, the abstract representation 704 of the navigation mesh includes a walkable area 705 (e.g., with white fill) and unwalkable areas 707A, 707B, and 707C (e.g., with diagonal fill) associated with the obstacles within the 3D environment 702.

As shown in FIG. 7A, the navigation graph 708 is generated based on the 3D environment 702 and the obstacles therein. As such, the navigation graph 708 includes nodes 709A, 709B, 709C, 709D, 709F, 709G, 709H, 709I, and 709J (sometimes collectively referred to as the "nodes 709"), wherein each node includes information for computing a path to another location within the navigation mesh. For example, the nodes 709 are placed outside of representations 711A, 711B, and 711C of the unwalkable areas 707A, 707B, 707C, respectively, for the obstacles within the 3D environment 702.

Figure 7B:
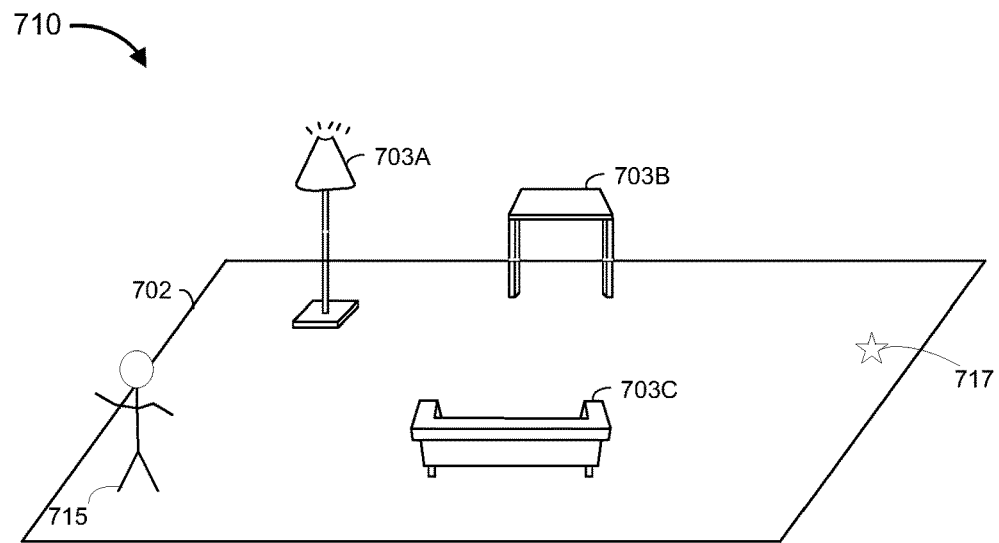
Figure 7B:
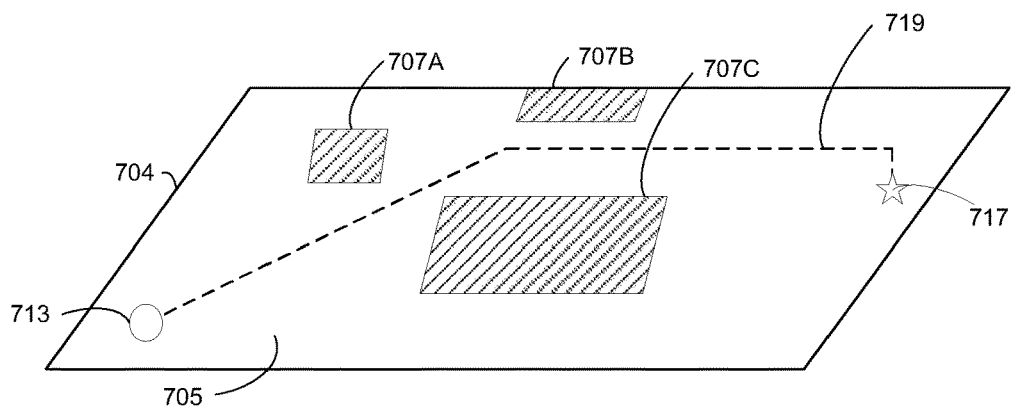
Figure 7B:
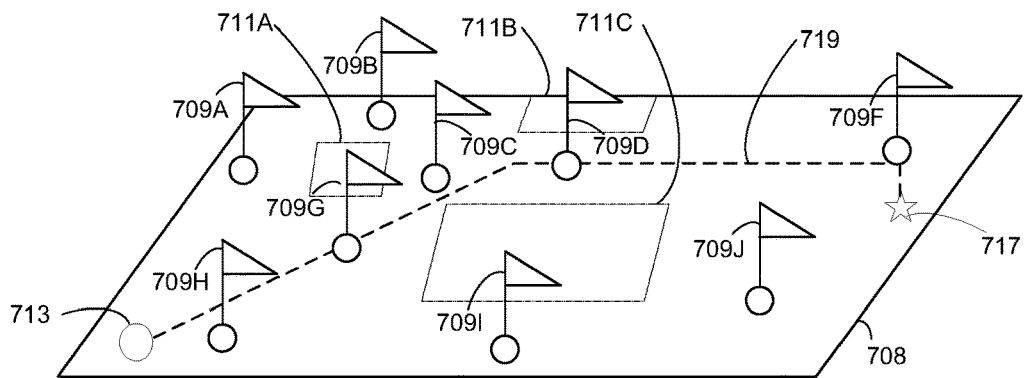

As shown in FIG. 7B, at instance 710 (e.g., associated with time T1) of the navigation scenario, the VA OS engine 240 instantiates a virtual agent (VA) 715 within the 3D environment 702 at an origin. In this example, a target destination 717 is obtained for the VA 715. Furthermore, continuing with this example, an initial path 719 is determined in order to locomote the VA 715 from its origin to the target destination 717. As shown in FIG. 7B, a representation 713 of the VA 715 is shown within the abstract representation 704 of the navigation mesh and the navigation graph 708 for ease of reference.

Figure 7C:
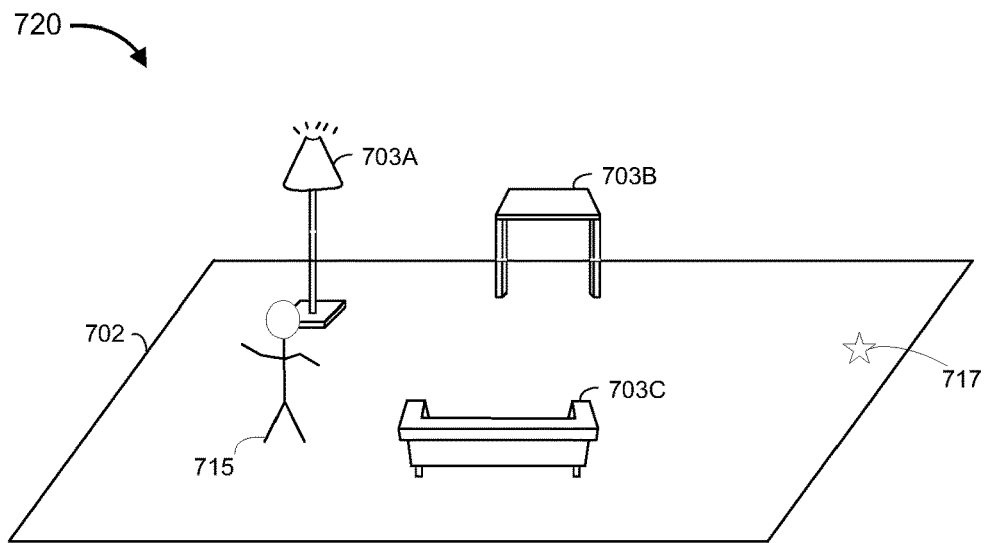
Figure 7C:
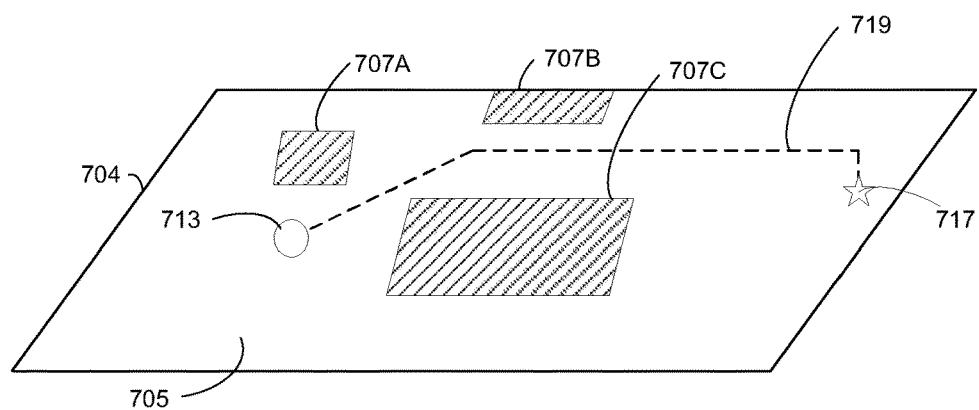
Figure 7C:
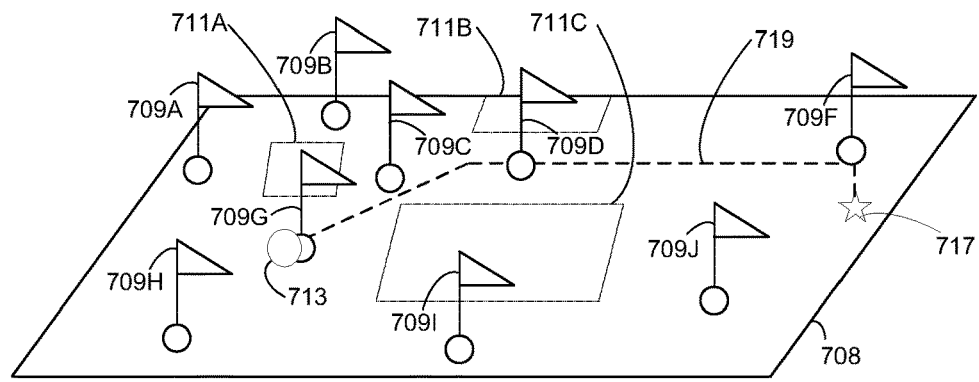

As shown in FIG. 7C, at instance 720 (e.g., associated with time T2) of the navigation scenario, the VA OS engine 240 detects of the node 709G of the navigation graph 708 when the VA 715 encounters the node 709G while locomoting according to the initial path 719. For example, one of the nodes 709 of the navigation graph 708 is detected when the VA 715 intersects, reaches, walks/runs into, or otherwise encounters a node.

Figure 7D:
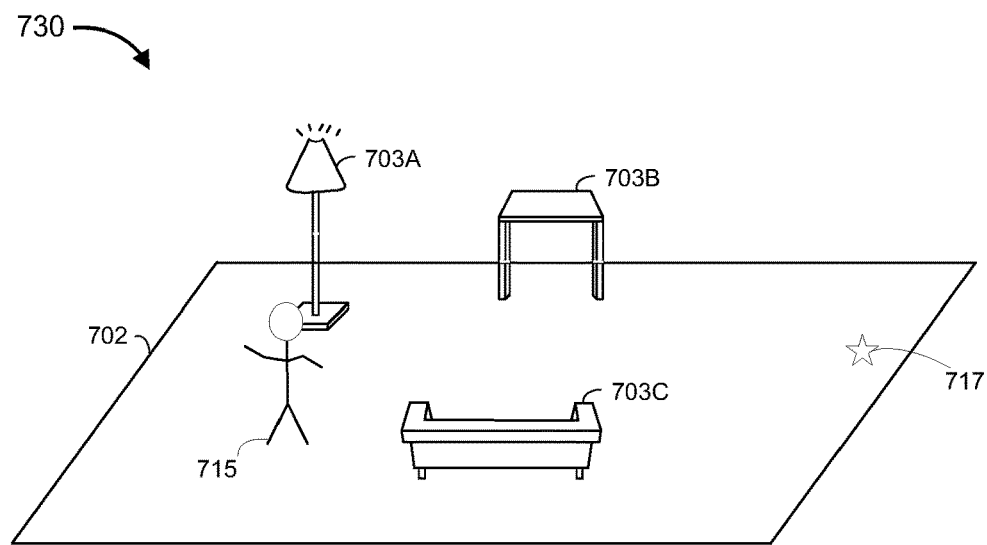
Figure 7D:
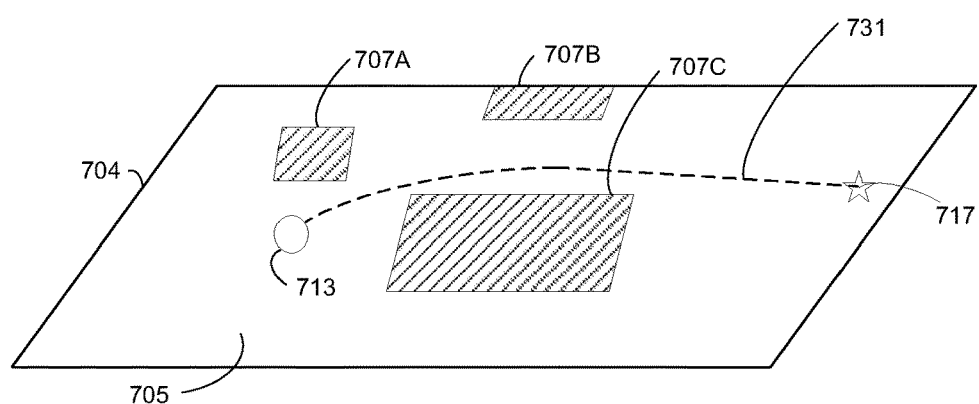
Figure 7D:
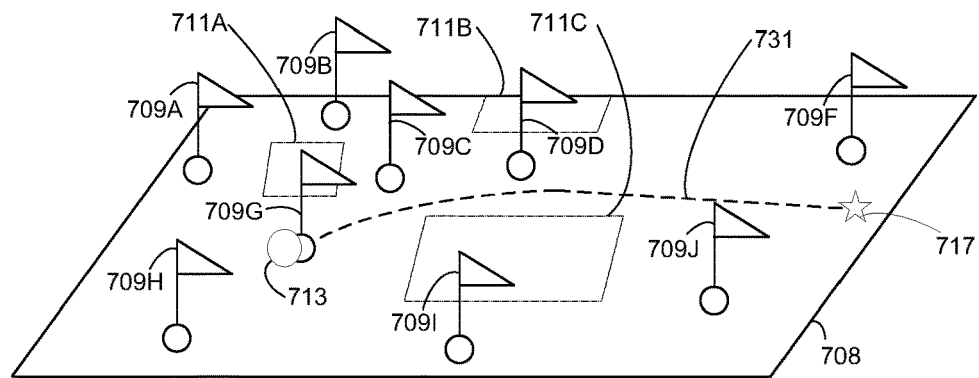

As shown in FIG. 7D, at instance 730 (e.g., associated with time T3) of the navigation scenario, the VA OS engine 240 determines of an updated path 731 from the node 709G to the target destination 717 based on navigation information obtained from the node 709G on the navigation graph 708. For example, the updated path 731 is more direct, more fluid, and/or more realistic than the initial path 719.

Figure 7E:
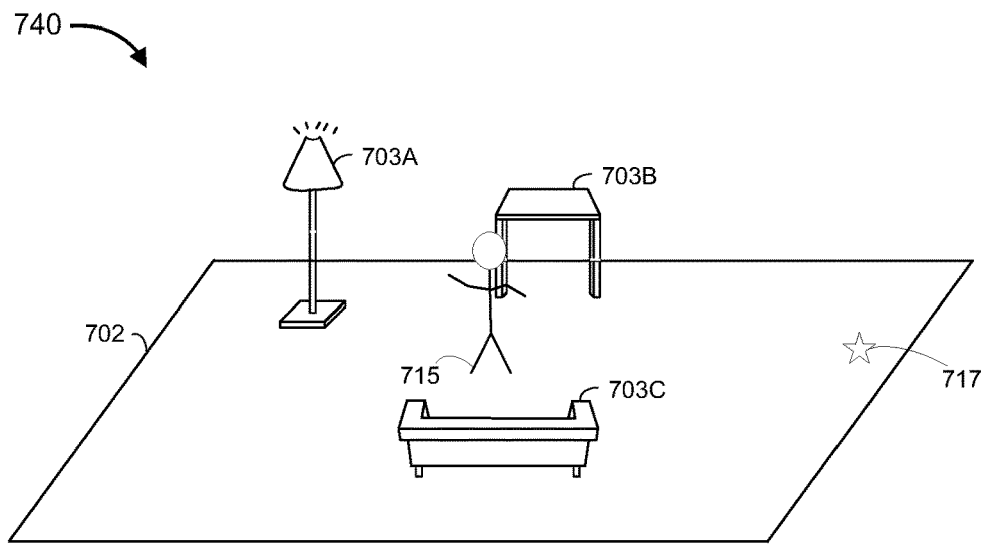
Figure 7E:
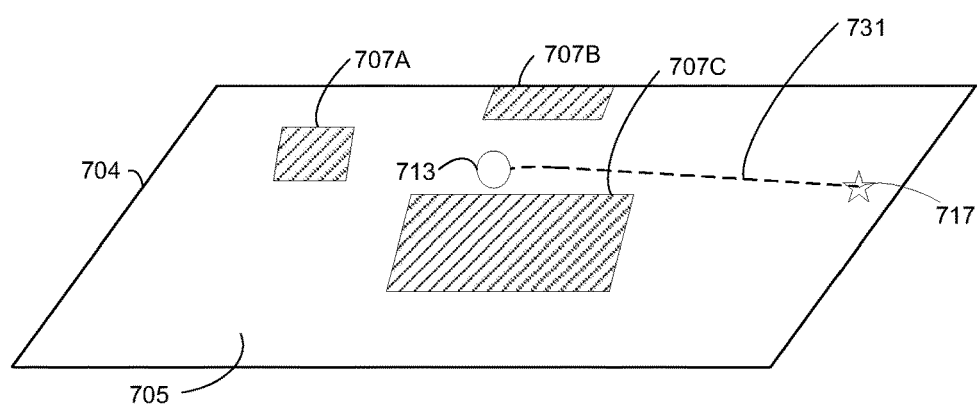
Figure 7E:
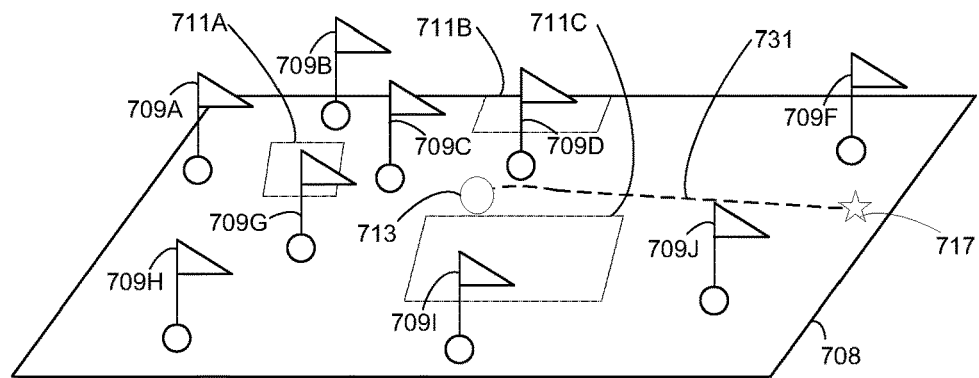
Figure 7F:
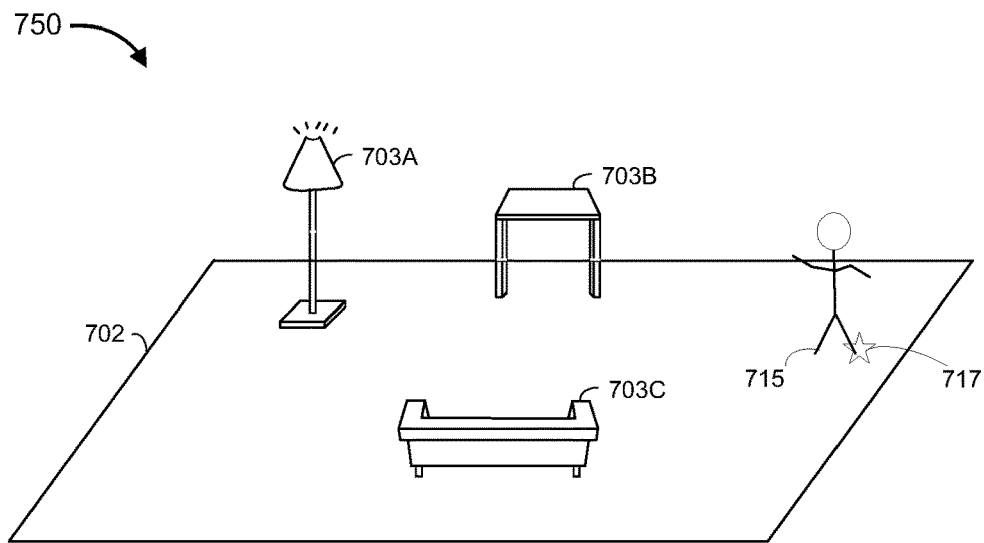
Figure 7F:
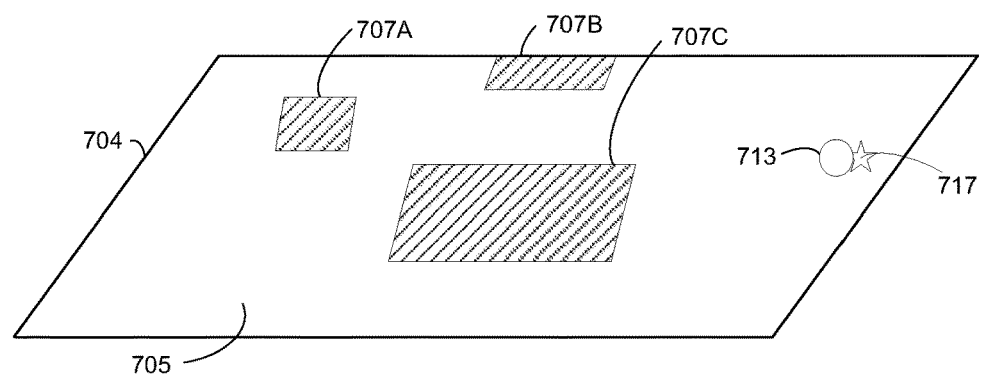
Figure 7F:
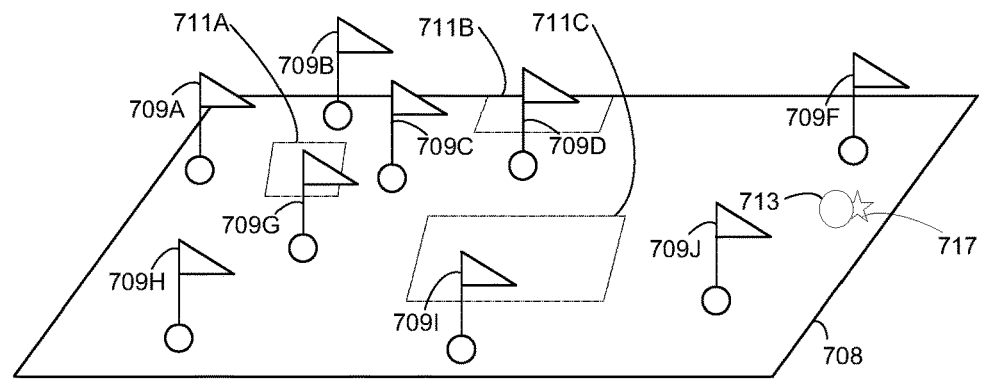

As shown in FIG. 7E, the instance 740 (e.g., associated with time T4) of the navigation scenario shows the VA 715 following the updated path 731 towards the target destination 717. As shown in FIG. 7F, the instance 750 (e.g., associated with time T5) of the navigation scenario shows the VA 715 at the target destination 717 after following the updated path 731 shown in FIGS. 7D and 7E.

Figure 8:
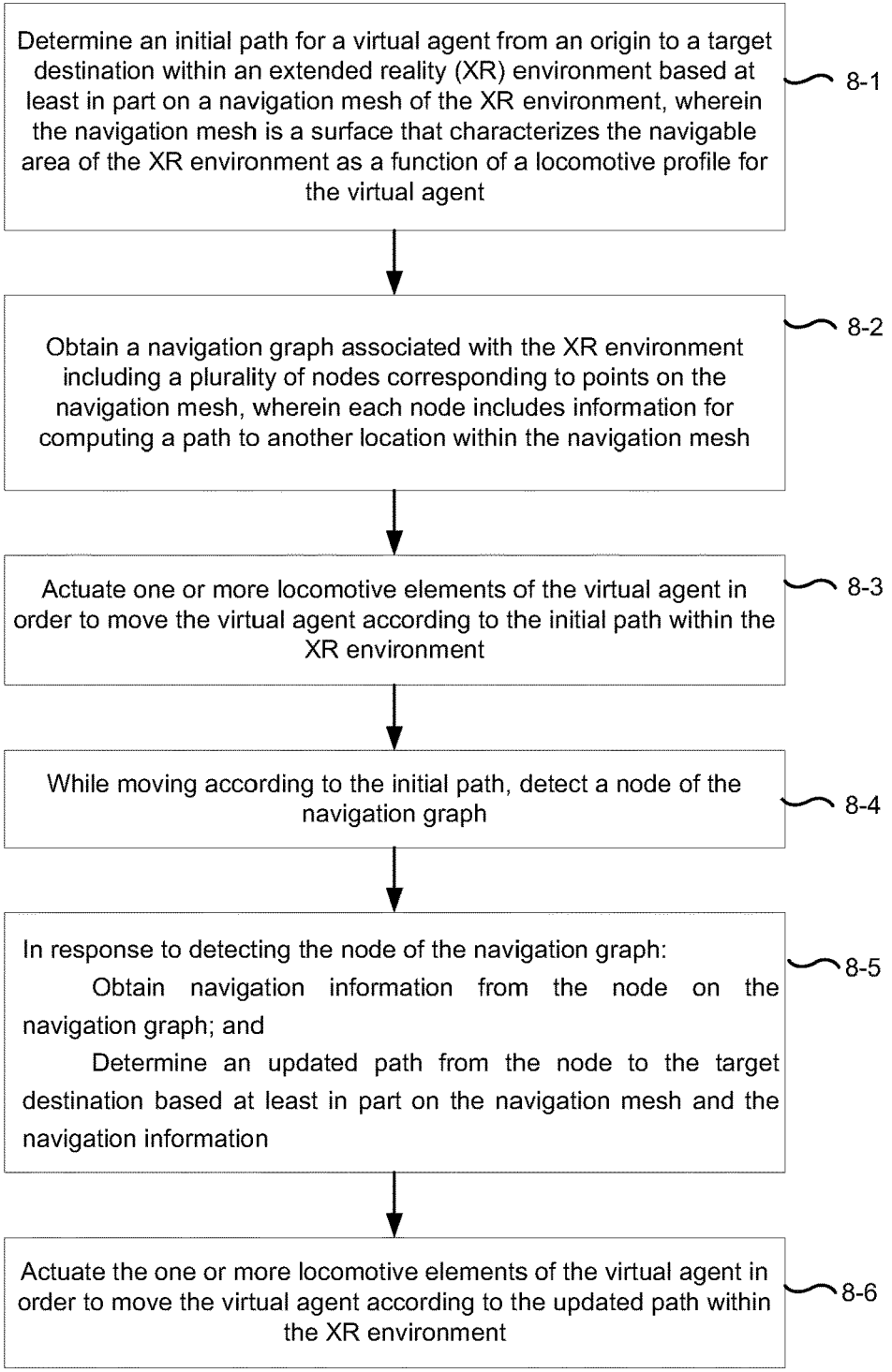
FIG. 8 is a flowchart representation of a method of improved pathfinding in accordance with some implementations.

FIG. 8 is a flowchart representation of a method 800 of improved pathfinding in accordance with some implementations. In various implementations, the method 800 is performed by a virtual agent operating system including non-transitory memory and one or more processors coupled with the non-transitory memory (e.g., the controller 110 in FIGS. 1 and 2; the electronic device 120 in FIGS. 1 and 3; or a suitable combination thereof), or a component thereof (e.g., the VA OS engine 240 in FIG. 2 or the navigation architecture 400 in FIG. 4). In some implementations, the method 800 is performed by processing logic, including hardware, firmware, software, or a combination thereof. In some implementations, the method 800 is performed by a processor executing code stored in a non-transitory computer-readable medium (e.g., a memory). In various implementations, some operations in method 800 are, optionally, combined and/or the order of some operations is, optionally, changed.

As described above, in some instances, navigation meshes have come to replace waypoint networks for virtual agents or non-player characters (NPCs) within video games and the like. As compared to waypoint networks, navigation meshes enable improved pathfinding flexibility. A navigation mesh, which includes a plurality of cells (triangles or convex polygons), represents the walkable (or otherwise navigable) area within a game level or related environment. Furthermore, each cell of the navigation mesh may be encoded with cell-specific metadata such as clearance, topography, toxicity, friction coefficient, etc. As one example, the A* or Dijkstra search algorithms may be used to find a path from an origin point to a destination point within the navigation mesh. Furthermore, once the path is computed, smoothing and/or steering algorithms may additionally be applied to make the path more realistic, e.g., a less zigzag-like path. The problem with this approach is the latency involved in computing the realistic path and failures of the search algorithms when handling a navigation mesh more complicated than a 2D planar surface. Thus, according to some implementations, a navigation graph may be used to perform pathfinding through the navigation mesh. In other words, the method 800 enables improved pathfinding through a navigation mesh by using a navigation graph that includes information for computing a path to another point within the navigation mesh.

As represented by block 8-1, the method 800 includes determining an initial path for a virtual agent from an origin to a target destination within an extended reality (XR) environment based at least in part on a navigation mesh of the XR environment, wherein the navigation mesh is a surface that characterizes the navigable area of the XR environment as a function of a locomotive profile for the virtual agent. In some implementations, the virtual agent operating system or a component thereof (e.g., the path determiner 248 in FIGS. 2 and 4) determines the initial path for the virtual agent from its origin (or current location) to a target destination within the XR environment. In some implementations, the virtual agent operating system or a component thereof instantiates the virtual agent into the XR environment at an origin. For example, a user instantiates the virtual agent into the XR environment at the origin by selecting the virtual agent from a set of available virtual agents and also selecting a location within the XR environment as the origin. As another example, the virtual agent operating system intelligently or pseudo-randomly selects the virtual agent from a set of available virtual agents and also selecting a location within the XR environment as the origin.

In some implementations, the virtual agent operating system or a component thereof (e.g., the destination/objective obtainer 246 in FIG. 2) obtains (e.g., receives, retrieves, or determines) a target destination or objective for the virtual agent within the XR environment (e.g., the virtual agent smells some virtual cheese within the XR environment, etc.). For example, the destination/objective is determined based on one or more user inputs (e.g., a voice command or the like), one or more user preferences (e.g., assigning the VA to perform a task such as pick up objects), and/or the like. As another example, the virtual agent operating system intelligently or pseudo-randomly selects the destination/objective from a predefined set of available destination/objectives for the XR environment or the like. As shown in FIG. 7B, the virtual agent 715 is instantiated into the 3D environment 702 (e.g., the XR environment), and an initial path 719 is determined in order to locomote the virtual agent 715 from its origin to the target destination 717.

In some implementations, the locomotive profile includes size characteristics for the virtual agent (e.g., height, width, depth, radius, etc.) and movement characteristics for the virtual agent (e.g., gait size, jump height, jump length, walk and run speed, etc.). In some implementations, the locomotive profile for a humanoid virtual agent (who is constrained by gravity, gait size, jump height, etc.) is different from a spider-like virtual agent (who can walk on walls and ceilings) and a flying insect-like virtual agent (who can fly in 3D). For example, the locomotive profile 251 in FIG. 5 is an example data structure for a locomotive profile.

In some implementations, the virtual agent corresponds to one of a humanoid entity, an animal entity, a robot entity, an NPC, or the like. In some implementations, the virtual agent is not handled, managed, or otherwise driven by a user. Instead, the virtual agent is handled, managed, and/or otherwise driven by the virtual agent operating system. In one example, the virtual agent corresponds to a bipedal humanoid or the like that is restricted by gravity and maintains contact with a planar surface of the XR environment such as the floor. In another example, the virtual agent corresponds to an entity, such as a spider, that is partially restricted or unrestricted by gravity and maintains contact with a planar surface of the XR environment such as the floor, walls, or ceiling. In some implementations, the virtual agent corresponds to any virtual entity, that is able to perceive the state of the XR environment and act upon or within the XR environment. As such, a virtual agent may be a factious or stylized entity (e.g., a stylized golf ball character, an animatable teacup character a fictional Abraham Lincoln character, and/or the like).

In some implementations, the method 800 further includes obtaining (e.g., receiving, retrieving, or generating) the navigation mesh for the XR environment. In some implementations, obtaining the navigation mesh includes generating a navigation mesh based on the locomotive profile for the virtual agent and the XR environment. In some implementations, the virtual agent operating system or a component thereof (e.g., the navigation mesh and navigation graph obtainer 244 in FIGS. 2 and 4) obtains the navigation mesh for the XR environment. In some implementations, the navigation mesh is generated for the XR environment using one of more known techniques in the art such as local clearance triangulation, explicit corridor map, clearance disk graph, recast, NEOGEN, and/or the like. In some implementations, the navigation mesh includes a plurality of cells such as triangles or convex polygons. In some implementations, each cell is associated with or encoded with metadata such as cell-specific clearance information, topography information, toxicity information, friction coefficient, and/or the like. For example, FIGS. 7A-7F show an example abstract representation 704 of a navigation mesh for the 3D environment 702 including a walkable area 705 and unwalkable areas 707A, 707B, and 707C (e.g., holes or obstacles associated with the 3D environment 702).

In some implementations, the XR environment corresponds to a multilevel structure with a first space and a second space connected by a discontinuous span. For example, the XR environment may include a first floor and a set of stairs connecting the first floor to a second floor. In this example, the discontinuous span corresponds to a stairway connecting two floors of a house. As shown in FIG. 6A, the 3D environment 630 corresponds to a mono-planar, multi-layer 3D environment where the walkable/locomotive area includes the first floor 632A and the second floor 632B connected by a stairway 634. For example, FIG. 6B shows a navigation mesh 634 for the 3D environment 630 including a first planar surface for the first floor 632A and a second planar surface for the second floor 632B connected by another planar surface for the stairway 634 connecting the first floor 632A and the second floor 632B.

In some implementations, the XR environment corresponds to a multi-spatial structure with a first space and a second space connected by a door. One of ordinary skill in the art will appreciate that the XR environment may take myriad forms.

In some implementations, the navigation mesh includes a continuous planar surface. For example, the continuous planar surface includes one or more holes associated with obstacles. As shown in FIG. 6A, the 3D environment 610 corresponds to a mono-planar, single layer 3D environment where the walkable/locomotive area is limited to the floor 612. As such, a navigation mesh for the 3D environment 610 corresponds to a continuous planar surface.

In some implementations, the navigation mesh includes at least two perpendicular planar surfaces. As shown in FIG. 6A, the 3D environment 620 corresponds to a multi-planar, single layer 3D environment where the walkable/locomotive area includes the floor 622, the ceiling 626, and the walls 624A, 624B, and 624C. As such, a navigation mesh for the 3D environment 620 corresponds to a discontinuous collection of perpendicular planar surfaces.

In some implementations, the navigation mesh corresponds to a three-dimensional (3D) volumetric region. As such, the virtual agent may freely move about the XR environment in three dimensions as if flying. Therefore, the virtual agent may be capable of 3D spatial reasoning and movement when the navigation mesh corresponds to a 3D volumetric region.

As represented by block 8-2, the method 800 includes obtaining (e.g., receiving, retrieving, or generating) a navigation graph associated with the XR environment including a plurality of nodes corresponding to points on the navigation mesh, wherein each node includes information for computing a path to another location within the navigation mesh. In some implementations, the virtual agent operating system or a component thereof (e.g., the navigation mesh and navigation graph obtainer 244 in FIGS. 2 and 4) obtains the navigation graph for the XR environment. In some implementations, the navigation graph is generated for the XR environment using one of more known techniques in the art and the navigation graph avoids any holes or obstacles within the XR environment. As one example, the navigation graph includes a plurality of disconnected nodes. As another example, the navigation graph includes a plurality of nodes connected by edges.

For example, FIGS. 7A-7F show an example navigation graph 708 generated based on the 3D environment 702 and the obstacles therein. As such, the navigation graph 708 in FIGS. 7A-7F includes nodes 709A, 709B, 709C, 709D, 709F, 709G, 709H, 709I, and 709J (sometimes collectively referred to as the "nodes 709"), wherein each node includes information for computing a path to another location within the navigation mesh. Furthermore, the nodes 709 of the navigation graph 708 in FIGS. 7A-7F are placed outside of representations 711A, 711B, and 711C for the obstacles within the 3D environment 702.

As represented by block 8-3, the method 800 includes actuating one or more locomotive elements of the virtual agent in order to move the virtual agent according to the initial path within the XR environment. In some implementations, the virtual agent operating system or a component thereof (e.g., the locomotive engine 250 in FIGS. 2 and 4) actuates one or more locomotive elements of the virtual agent in order to move the virtual agent according to the initial path within the XR environment. For example, in FIGS. 7B and 7C, the virtual agent 715 traverses the 3D environment 702 to the target destination 717 according to the initial path 719.

While moving according to the initial path, as represented by block 8-4, the method 800 includes detecting (e.g., intersecting, reaching, or walking/running into) a node of the navigation graph. In some implementations, the virtual agent operating system or a component thereof determines whether the virtual agent has detected (e.g., intersected, reached, walked/ran into, or otherwise encountered) a node of a navigation graph.

In response to detecting the node of the navigation graph, as represented by block 8-5, the method 800 includes: obtaining navigation information from the node of the navigation graph; and determining an updated path from the node to the target destination based at least in part on the navigation mesh and the navigation information. If a node of the navigation graph has been detected, the virtual agent operating system or a component thereof obtains navigation information from the node of the navigation graph. The virtual agent operating system or a component thereof (e.g., the path updater 249 in FIGS. 2 and 4) determines an updated path from the node to the target destination based at least in part on the navigation mesh and the navigation information.

For example, with reference to FIG. 7D, the virtual agent 715 intersects, reaches, walks/runs into, or otherwise encounters the node 709G of the navigation graph 708 and obtains navigation information from the node 709G. Continuing with this example, in FIG. 7E, the virtual agent operating system or a component thereof determines an updated path 731 from the node 709G to the target destination 717 based on navigation information obtained from the node 709G on the navigation graph 708.

As represented by block 8-6, the method 800 includes actuating the one or more locomotive elements of the virtual agent in order to move the virtual agent according to the updated path within the XR environment. In some implementations, the virtual agent operating system or a component thereof (e.g., the locomotive engine 250 in FIGS. 2 and 4) actuates one or more locomotive elements of the virtual agent in order to move the virtual agent according to the updated path within the XR environment. For example, in FIGS. 7E and 7F, the virtual agent 715 traverses the 3D environment 702 to the target destination 717 according to the updated path 731.

In some implementations, the method 800 further includes presenting the XR environment including the movements of the virtual agent. For example, the controller 110, the device 120, a suitable combination thereof, or component(s) thereof (e.g., the content manager 274 in FIG. 2) renders the XR environment including the movements and actions of the virtual agents. Continuing with this example, the controller 110, the device 120, a suitable combination thereof, or component(s) thereof (e.g., the presenter 344 in FIG. 3) presents the rendered XR environment via a display. As one example, with reference to FIGS. 7B-7F, the controller 110, the device 120, a suitable combination thereof, or component(s) thereof may manage and render the 3D environment 702 as the virtual agent 715 follows the initial path 719 and later the updated path 731 in order to reach the target destination 717. In some implementations, the method 800 further includes modifying the target destination or objective of the virtual agent based on one or more user inputs.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a virtual agent operating system including non-transitory memory and one or more processors coupled with the non-transitory memory:
        determining an initial path for a virtual agent from an origin to a target destination within an extended reality (XR) environment based at least in part on a navigation mesh of the XR environment, wherein the navigation mesh is a surface that characterizes the navigable area of the XR environment as a function of a locomotive profile for the virtual agent;
        obtaining a navigation graph associated with the XR environment including a plurality of nodes corresponding to points on the navigation mesh, wherein each node includes information for computing a path to another location within the navigation mesh;
        actuating one or more locomotive elements of the virtual agent in order to move the virtual agent according to the initial path within the XR environment;
        while moving the virtual agent according to the initial path:
            in accordance with a determination that a current location of the virtual agent is not proximate to one of the plurality of nodes of the navigation graph, maintaining movement of the virtual agent according to the initial path; and
            in accordance with a determination that the current location of the virtual agent is proximate to one of the plurality of nodes of the navigation graph:
                obtaining navigation information from the node of the navigation graph associated with the current location of the virtual agent;
                determining an updated path from the node to the target destination based at least in part on the navigation mesh and the navigation information from the node of the navigation graph; and
                actuating the one or more locomotive elements of the virtual agent in order to move the virtual agent according to the updated path within the XR environment.

2. The method of claim 1, wherein the locomotive profile includes size characteristics for the virtual agent and movement characteristics for the virtual agent.

3. The method of claim 1, further comprising:
    obtaining the navigation mesh for the XR environment.

4. The method of claim 3, wherein obtaining the navigation mesh includes generating a navigation mesh based on the locomotive profile for the virtual agent and the XR environment.

5. The method of claim 1, wherein the XR environment corresponds to a multilevel structure with a first space and a second space connected by a discontinuous span.

6. The method of claim 1, wherein the XR environment corresponds to a multi-spatial structure with a first space and a second space connected by a door.

7. The method of claim 1, wherein the navigation mesh includes one of: a continuous planar surface, at least two perpendicular planar surfaces, or a three-dimensional volumetric region.

8. The method of claim 1, wherein the node of the navigation graph is detected according to a determination that the current location of the virtual agent is proximate to one of the plurality of nodes of the navigation graph, and the method further comprising:
    in accordance with a determination that the current location of the virtual agent is not proximate to one of the plurality of nodes of the navigation graph, maintaining movement of the virtual agent according to the initial path.

9. A virtual agent operating system comprising:
    one or more processors;
    a non-transitory memory; and
    one or more programs stored in the non-transitory memory, which, when executed by the one or more processors, cause the virtual agent operating system to:
        determine an initial path for a virtual agent from an origin to a target destination within an extended reality (XR) environment based at least in part on a navigation mesh of the XR environment, wherein the navigation mesh is a surface that characterizes the navigable area of the XR environment as a function of a locomotive profile for the virtual agent;
        obtain a navigation graph associated with the XR environment including a plurality of nodes corresponding to points on the navigation mesh, wherein each node includes information for computing a path to another location within the navigation mesh;
        actuate one or more locomotive elements of the virtual agent in order to move the virtual agent according to the initial path within the XR environment;
        while moving the virtual agent according to the initial path:

in accordance with a determination that a current location of the virtual agent is not proximate to one of the plurality of nodes of the navigation graph, maintain movement of the virtual agent according to the initial path; and in accordance with a determination that the current location of the virtual agent is proximate to one of the plurality of nodes of the navigation graph:

obtain navigation information from the node of the navigation graph associated with the current location of the virtual agent;

determine an updated path from the node to the target destination based at least in part on the navigation mesh and the navigation information from the node of the navigation graph; and actuate the one or more locomotive elements of the virtual agent in order to move the virtual agent according to the updated path within the XR environment.

10. The virtual agent operating system of claim 9, wherein the locomotive profile includes size characteristics for the virtual agent and movement characteristics for the virtual agent.

11. The virtual agent operating system of claim 9, wherein the one or more programs further causes the virtual agent operating system to:

obtain the navigation mesh for the XR environment, wherein obtaining the navigation mesh includes generating a navigation mesh based on the locomotive profile for the virtual agent and the XR environment.

12. The virtual agent operating system of claim 9, wherein the XR environment corresponds to a multilevel structure with a first space and a second space connected by a discontinuous span.

13. The virtual agent operating system of claim 9, wherein the XR environment corresponds to a multi-spatial structure with a first space and a second space connected by a door.

14. The virtual agent operating system of claim 9, wherein the navigation mesh includes one of: a continuous planar surface, at least two perpendicular planar surfaces, or a three-dimensional volumetric region.

15. The virtual agent operating system of claim 9, wherein the node of the navigation graph is detected according to a determination that the current location of the virtual agent is proximate to one of the plurality of nodes of the navigation graph, and wherein the one or more programs further cause the virtual agent operating system to:

in accordance with a determination that the current location of the virtual agent is not proximate to one of the plurality of nodes of the navigation graph, maintaining movement of the virtual agent according to the initial path.

16. A non-transitory memory storing one or more programs, which, when executed by one or more processors of a virtual agent operating system, cause the virtual agent operating system to:

determine an initial path for a virtual agent from an origin to a target destination within an extended reality (XR) environment based at least in part on a navigation mesh of the XR environment, wherein the navigation mesh is a surface that characterizes the navigable area of the XR environment as a function of a locomotive profile for the virtual agent;

obtain a navigation graph associated with the XR environment including a plurality of nodes corresponding to points on the navigation mesh, wherein each node includes information for computing a path to another location within the navigation mesh;

actuate one or more locomotive elements of the virtual agent in order to move the virtual agent according to the initial path within the XR environment;

while moving the virtual agent according to the initial path:

in accordance with a determination that a current location of the virtual agent is not proximate to one of the plurality of nodes of the navigation graph, maintain movement of the virtual agent according to the initial path; and in accordance with a determination that the current location of the virtual agent is proximate to one of the plurality of nodes of the navigation graph:

obtain navigation information from the node of the navigation graph associated with the current location of the virtual agent; determine an updated path from the node to the target destination based at least in part on the navigation mesh and the navigation information from the node of the navigation graph; and actuate the one or more locomotive elements of the virtual agent in order to move the virtual agent according to the updated path within the XR environment.

17. The non-transitory memory of claim 16, wherein the locomotive profile includes size characteristics for the virtual agent and movement characteristics for the virtual agent.

18. The non-transitory memory of claim 16, wherein the one or more programs further cause the virtual agent operating system to:

obtain the navigation mesh for the XR environment, wherein obtaining the navigation mesh includes generating a navigation mesh based on the locomotive profile for the virtual agent and the XR environment.

19. The non-transitory memory of claim 16, wherein the XR environment corresponds to a multilevel structure with a first space and a second space connected by a discontinuous span.

20. The non-transitory memory of claim 16, wherein the XR environment corresponds to a multi-spatial structure with a first space and a second space connected by a door.

21. The non-transitory memory of claim 16, wherein the navigation mesh includes one of: a continuous planar surface, at least two perpendicular planar surfaces, or a three-dimensional volumetric region.

22. The non-transitory memory of claim 16, wherein the node of the navigation graph is detected according to a determination that the current location of the virtual agent is proximate to one of the plurality of nodes of the navigation graph, and wherein the one or more programs further cause the virtual agent operating system to:

in accordance with a determination that the current location of the virtual agent is not proximate to one of the plurality of nodes of the navigation graph, maintaining movement of the virtual agent according to the initial path.

* * * * *